Sept. 8, 1964    E. C. YACKEL ETAL    3,148,063
LIGHT-SENSITIVE ELEMENT FOR PREPARING ETCHING RESIST FOR GRAVURE PURPOSES
Filed Dec. 18, 1959
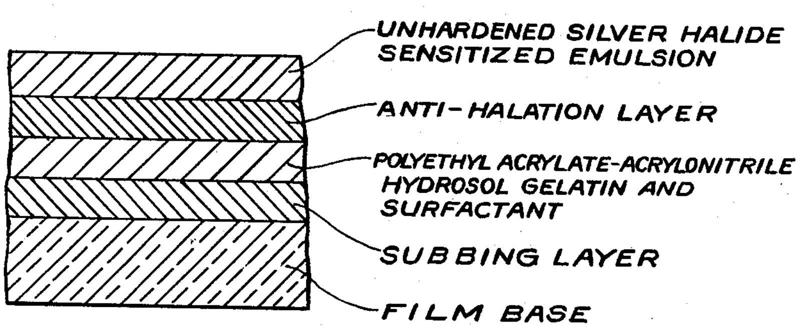
Edward C. Yackel
James G. Smith
INVENTORS
BY R. Frank Smith
Scranton C. Van Houten
ATTORNEYS

United States Patent Office 3,148,063

Patented Sept. 8, 1964

3,148,063

LIGHT-SENSITIVE ELEMENT FOR PREPARING ETCHING RESIST FOR GRAVURE PURPOSES

Edward C. Yackel and James G. Smith, Rochester, N.Y., assignors to Eastman Kodak Company, Rochester, N.Y., a corporation of New Jersey Filed Dec. 18, 1959, Ser. No. 860,399

5 Claims. (Cl. 96—83)

This application is a continuation-in-part of U.S. Serial No. 693,621, filed October 31, 1957, of Edward C. Yackel and James G. Smith.

This invention relates to a light-sensitive element adapted for preparing the etching resist for photogravure platemaking purposes, which element is supplied with a dimensionally stable temporary support from which it can be separated readily without the use of an organic solvent.

In the preparation of the etching resist in the photogravure process, so-called "carbon tissue" has been employed for many years. This material consists of a paper support coated with a pigment-gelatin layer which is sensitized to ultraviolet radiation and blue light by use of a bichromate solution. The carbon-tissue has several serious shortcomings. It requires an intense light source for exposure; it has poor stability because of the propensity of the bichromate sensitizer to harden the gel layer gradually on keeping; it has poor dimensional stability; it is very fragile; and it does not adapt itself readily to sensitometric measurements and control.

Light-sensitive elements have been proposed which are adapted to improve on carbon tissue for the preparation of etching resists for photogravure platemaking. These elements have included the use of a cellulose ester film base and a protective layer adjacent to the layer containing the sensitized gelatin coating, said protective layer remaining temporarily adherent to the upper surface of the gelatin relief formed by processing the sensitized gelatin coating. After the gelatin relief is applied to a copper surface to form a resist for subsequent etching, it has been necessary to employ an organic solvent to remove the protective layer prior to the etching operation.

An object of our invention is to provide an element for use in photogravure processes, the use of which does not require an organic solvent to remove the protective layer covering the etching resist. Another object of our invention is to provide for use in photogravure processes, an element of good stability and of sufficient sensitivity that the use of an intense light source, such as a carbon arc, is not necessary. Other objects of our invention will appear herein.

The light-sensitive elements of our invention are carried by a conventional film base such as cellulose acetate base, cellulose acetate butyrate base, polystyrene base, or the like, having a thickness substantially on the order of 0.005 to .015 inch. This film base is provided with a subbing layer such as a layer of cellulose nitrate having a thickness on the order of 0.0002 inch. Upon this subbed film base is applied a stripping layer essentially consisting of a mixture of polyethylacrylate-acrylonitrile hydrosol containing surfactant and gelatin. The composition of this layer is critical in that a clean separation should be obtained therewith in the stripping operation. The polymer of the hydrosol is made up of the product resulting from polymerizing a mixture of 60–90% ethylacrylate and 30–10% of acrylonitrile. The composition of the stripping layer can vary in the ratio of hydrosol to gelatin between 90:10 and 85:15, based on solids weight, preferably being approximately 87:13. The dry coverage of this layer can be from 0.1 to 1.0 gram of solids per square foot with the preferred level at 0.3–0.4 gram per square foot. This composition also contains a surfactant present as a result of the emulsion polymerization to prepare the hydrosol. Over the stripping layer, an antihalation layer is applied ordinarily comprising a layer of gelatin containing an antihalation dye, a Carey Lea filtering material or a coloring material such as manganese dioxide preferably at the coverage of 0.7–0.8 gram per square foot, dry weight. A light-sensitive silver halide gelatin emulsion layer is then applied, the gelatin of this layer being unhardened and without any hardeners therein. A silver bromoiodide emulsion has been found to be quite suitable for this purpose. However, various silver salts may be used as the sensitive salt such as silver bromide, silver iodide, silver chloride, or mixed silver halides such as silver chlorobromide. The reason for the emulsion layer being in unhardened condition is that in use of the element the gelatin of the silver-halide emulsion layer is differentially hardened in the processing bath so that a tanned image is formed in the emulsion layer. Hardening of the gelatin in the emulsion layer would interfere with the use of the element in accordance with our invention.

The element of our invention may be used in any of several gravure processes. For example, the element in accordance with our invention may be subjected to short exposure while in effective contact with an image or any other type of element, such as the image modulated light beam from a photoelectric scanning device, which will impart a latent image to the silver halide emulsion, as is well known in the photographic art. After exposure, the element, the emulsion of which has been exposed, is developed, fixed, washed and dried, which procedure differentially affects the gelatin of the emulsion layer imparting a hardening and insolubilizing effect to the gelatin around the silver grains of the image.

A satisfactory method for processing the element in accordance with our invention is by a series of steps as follows:

(1) The element is bathed at 68° F. for 2 minutes in a developing solution consisting of:

| | Grams |
|---|---|
| Elon | 1.0 |
| Hydroquinone | 2.0 |
| Pyrogallic acid | 6.0 |
| Sodium sulfite | 9.0 |
| Potassium bromide | 1.5 |
| Sodium sulfate | 75.0 |
| Potassium metabisulfite | 5.0 |
| Water to make 1 liter. | |

(2) The liquid is drained off for 15 seconds.

(3) The element is developed at 68° F. for 2 minutes in an alkaline solution consisting of:

| | | |
|---|---|---|
| Trisodium phosphate | grams | 100 |
| Sodium sulfate | do | 75 |
| Phosphoric acid (85%) | cc | 5 |
| Water to make 1 liter. | | |

(4) The liquid is drained off for 15 seconds and rinsed for 60 seconds at 68° F. in a bath consisting of sodium diacetate 100 grams, water to make 1 liter.

(5) Fixing is carried out for 5 minutes at 68° F. in a bath of the following composition:

| | | |
|---|---|---|
| Sodium thiosulfate | grams | 240 |
| Sodium sulfite (desiccated) | do | 10 |
| Sodium bisulfite | do | 25 |
| Glacial acetic acid | cc | 20 |

Water to make 1 liter.

(6) Wash in running water for 5–10 minutes.

(7) Immerse in the following solution for 60 seconds at room temperature:

| | | |
|---|---|---|
| Photo-Flo (wetting agent) | cc | 10 |
| Semicarbazide hydrochloride | gram | 1 |
| Ammonium hydroxide (28%) | cc | 10 |

Water to make 1 liter.

(8) Excess liquid is removed and the film is dried at either room temperature or elevated temperature.

After the element has been processed as described above the base is conveniently stripped off and the unhardened gel removed by a wash-off procedure as follows:

(1) The processed gravure resist film is rolled, emulsion side down, onto the wetted surface of a copper gravure cylinder.

(2) The cylinder is sprayed with running water for 1–3 minutes at 40°–60° F.

(3) The film base support is gently peeled therefrom leaving the emulsion adhering to the gravure cylinder or plate and is washed with water at 100–120° F. for 3–5 minutes. There remains a differentially hardened gelatin and silver image of varying degrees of thickness on the cylinder.

(4) The cylinder is flooded with a mixture of water and alcohol (80% alcohol).

With the copper cylinder containing the relief image the etched surface is formed in the following manner: some sort of protection such as asphaltum is applied to the areas of the copper which are unprotected by the image and are not to be etched. The copper is then subjected to an etching operation such, for example, as with ferric chloride as known in the art. The copper surface is thereby differentially etched inversely to the thickness and hardness of the gelatin which resides on the surface of the copper. There results relief images adapted for use in photogravure printing operations.

Referring now to the accompanying drawing FIGURE 1 thereof illustrates the combination of layers which go to make up a light-sensitive element in accordance with the invention. The gelatin layer under the emulsion may, if desired, contain a yellow Carey Lea silver dispersion or some other antihalation material. If desired, it may be plasticized with a gelatin plasticizer such as glycerin or the like.

In the combination shown the film base or support is coated on the emulsion side with the layers in this order:

(1) Cellulose nitrate subbing layer.

(2) A stripping layer composed of polyethylacrylate-acrylonitrile hydrosol which contains a surfactant and gelatin.

(3) A gelatin layer containing antihalation material therein.

(4) The sensitive photographic emulsion layer in which no material which would cause hardening of the gelatin prior to the processing of this layer has been used.

The stripping layer in accordance with our invention is composed of a hydrosol resulting from the emulsion polymerization of ethylacrylate and acrylonitrile in the proportions of 60–90% of ethylacrylate and 30–10% of acrylonitrile, in which emulsion polymerization there was present a peroxide catalyst such as benzoyl peroxide and a surface-active agent. The surface-active agent is an anionic wetting agent having a long hydrophobic chain such as alkyl or aralkyl, etc., terminating in a sulfate or sulfonate group and optionally having intermediate polyethoxy, amide or other hydrophilic groups such as:

(1) The sodium salt of N-methyl-N-oleyl taurine.

(2) Tetrasodium-N-(1,2-dicarboxyethyl) N-octadecyl sulfosuccinamate.

(3) The sodium salt of a p-tertiary-octylphenoxy polyethoxyethyl sulfate where the number of ethoxy groups may average 3, but is usually a mixture of several chain lengths of different numbers of ethoxy groups.

(4) Sodium lauryl sulfate.

Instead of or in addition to the above, a surface-active agent useful for facilitating stripping is dioctadecyldimethyl-ammonium chloride, especially of commercial or technical grade.

The working limits of the surface-active agent is from 1–5% by weight of the dry monomeric material in the preparation of the hydrosols, preferably from 2–4%.

Some antihalation dyes which may be used in the antihalation layer of our invention instead of Carey Lea silver may include:

(1) Congo red.

(2) The product which results when 2-naphthylamine-6,8-disulfonic acid is diazotized and coupled with an equimolar amount of chromotopic acid.

(3) The product (Schultz No. 208) which results when 1-naphthylamine-4-sulfonic acid is diazotized and coupled with an equimolar amount of 1-naphthol-4-sulfonic acid.

We claim:

1. A gravure resist film consisting of a dimensionally stable, temporary, subbed film support containing thereon as the only layers: a stripping layer composed of an ionic surface active agent, 10–15% gelatin and 85–90% (dry weight) of a water-insoluble polyethylacrylate-acrylonitrile copolymer latex of which polymer ethylacrylate units comprise 60–90 weight percent, a gelatin layer containing a light absorbing material and as the top layer a hardener-free light sensitive gelatin-silver halide photographic emulsion layer.

2. A gravure resist film consisting of a dimensionally stable, temporary, subbed film support containing thereon as the only layers: a stripping layer composed of an ionic surface active agent, 10–15% gelatin and 85–90% (dry weight) of a water-insoluble polyethylacrylate-acrylonitrile copolymer latex of which polymer ethylacrylate units comprise 60–90 weight percent, a Carey Lea silver gelatin layer and as the top layer a hardener-free light sensitive gelatin-silver halide photographic emulsion layer.

3. A gravure resist film consisting of dimensionally stable, temporary, cellulose nitrate subbed film suport containing thereon as the only layers: a stripping layer composed of an ionic surface active agent, 10–15% of gelatin and 85–90% (dry weight) of a water-insoluble polyethylacrylate-acrylonitrile copolymer latex of which polymer the ethylacrylate units comprise 60–90 weight percent, a gelatin layer containing a light absorbing material and as the top layer a hardener-free light sensitive gelatin-silver bromoiodide photographic emulsion layer.

4. A gravure resist film cnosisting of dimensionally stable, temporary, cellulose nitrate subbed film support containing thereon as the only layers: a stripping layer composed except for an ionic surface active agent of 13% of gelatin and 87% (dry weight) of a water-insoluble polyethylacrylate-acrylonitrile copolymer of which polymer ethylacrylate units comprise 60–90 weight percent, a Carey Lea silver-gelatin layer and as the top layer a hardener-free light sensitive gelatin-silver bromoiodide photographic emulsion layer.

5. In a gravure resist film comprising a stripping layer, a gelatin layer containing light absorbing material and a hardener free gelatin-silver halide photographic emulsion layer, the stripping layer essentially consisting of gelatin, water-insoluble polyethylacrylate-acrylonitrile copolymer and dioctadecyl-dimethyl ammonium chloride as the surface active agent therein.

References Cited in the file of this patent

UNITED STATES PATENTS

| | | |
|---|---|---|
| 1,971,430 | Schneider | Aug. 28, 1934 |
| 1,981,425 | McNally | Nov. 20, 1934 |
| 2,448,508 | Alles | Sept. 7, 1948 |
| 2,448,552 | Schulze | Sept. 7, 1948 |
| 2,481,770 | Nadeau | Sept. 13, 1949 |
| 2,835,582 | Fowler et al. | May 20, 1958 |
| 2,848,434 | Hellman | Aug. 19, 1958 |
| 2,853,457 | Gates et al. | Sept. 23, 1958 |
| 2,976,147 | Alles | Mar. 21, 1961 |
| 3,005,787 | Waring et al. | Oct. 24, 1961 |
| 3,010,838 | Uber | Nov. 28, 1961 |
| 3,062,674 | Houck et al. | Nov. 6, 1962 |